| | | |
|---|---|---|
| [19] | | |

United States Patent
Caliva

[11] Patent Number: 5,720,890
[45] Date of Patent: Feb. 24, 1998

[54] WEIR CLEANING APPARATUS AND METHOD

[76] Inventor: Anthony L. Caliva, 8307 Glenalta, Houston, Tex. 77061

[21] Appl. No.: 550,365

[22] Filed: Oct. 30, 1995

[51] Int. Cl.$^6$ .................................................. B01D 21/06
[52] U.S. Cl. .......................... 210/800; 210/528; 210/530; 210/541; 15/246.5
[58] Field of Search .................. 210/525, 528, 210/529, 530, 541, 241, 800, 804; 15/246.5

[56] References Cited

U.S. PATENT DOCUMENTS

| | | | |
|---|---|---|---|
| 2,238,024 | 4/1941 | Linch | 210/529 |
| 2,261,487 | 11/1941 | Scott et al. | 210/529 |
| 4,043,920 | 8/1977 | Wooh | 210/529 |
| 4,830,748 | 5/1989 | Hall | 210/528 |
| 4,876,010 | 10/1989 | Riddle | 210/528 |
| 4,978,447 | 12/1990 | Hall | 210/530 |

*Primary Examiner*—Christopher Upton
*Attorney, Agent, or Firm*—Kenneth A. Roddy

[57] ABSTRACT

An apparatus for cleaning algae and debris from the inner and outer surfaces of a weir and the top surface and outer side wall of a spillway in a water treatment tank. A main frame is mounted on the revolving skimmer arm of the tank. A pair of brushes pivotally mounted to a lower end of a support arm have bristles facing in inwardly opposed relation to engage each side of the weir for cleaning both side surfaces of the weir. The support arm is connected to the main frame by a universal joint to pivot in a vertical plane and move in and out relative to the center of rotation to compensate for out-of-round weir surfaces. The brushes are spring biased downwardly in a vertical position and pivotally mounted to the support arm to allow pivotal movement when their lower ends engage a bracket or obstruction so that they pass thereover and return to the vertical position. A third brush connected with the pair of brushes engages and cleans the upper surface of the spillway adjacent the weir. A fourth brush pivotally mounted in a vertical position to the lower end of a second support arm engages and cleans the outer surface of the spillway. A tension spring connects the main frame and second support arm and allows the fourth brush to move in and out relative to the center of rotation to compensate for out-of-round spillway surfaces.

18 Claims, 2 Drawing Sheets

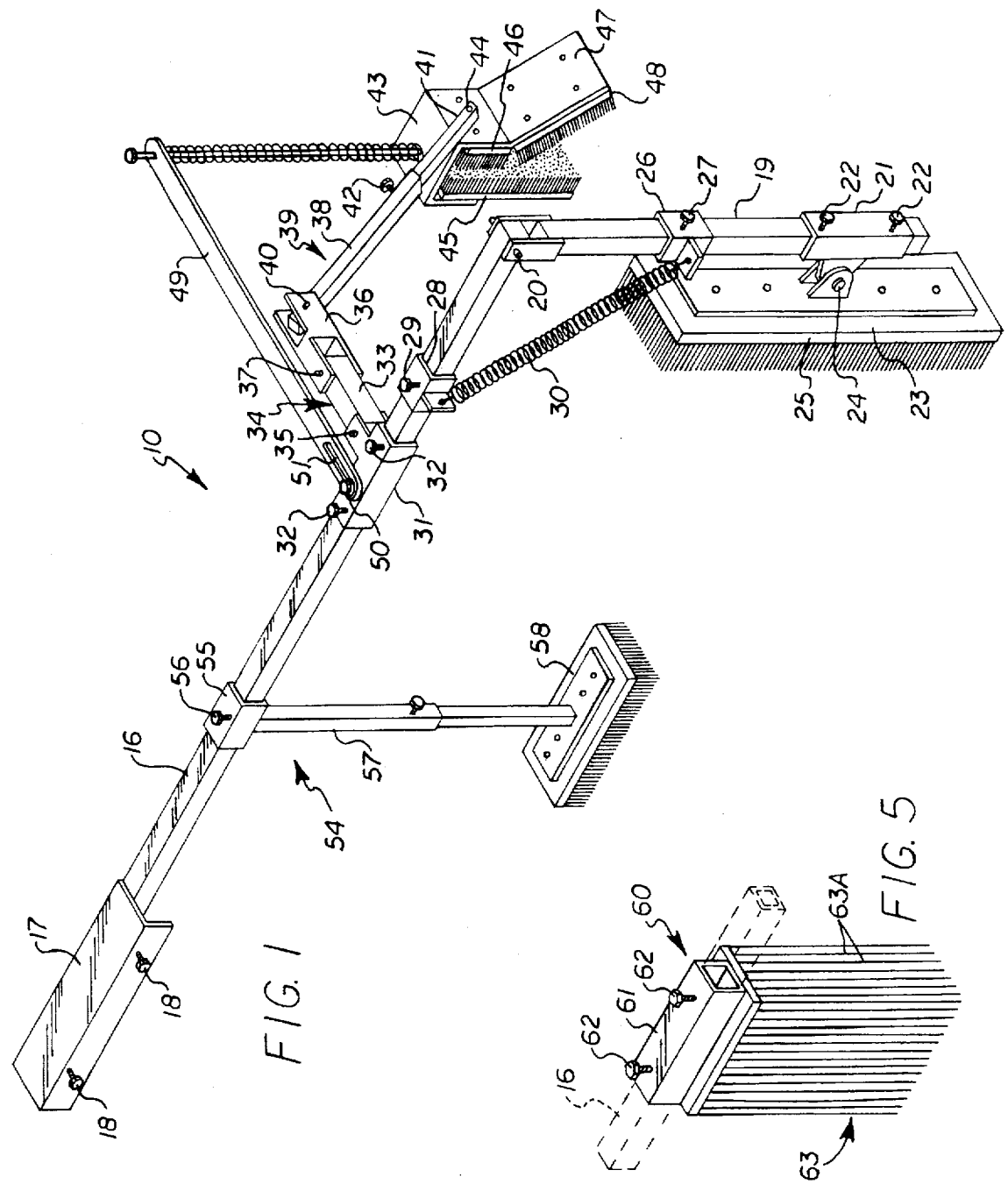

WEIR CLEANING APPARATUS AND METHOD

BACKGROUND OF THE INVENTION

1. Field of the Invention

This invention relates generally to cleaning of sewage treatment tanks, and more particularly to an apparatus and method for cleaning the weirs of a sedimentation water treatment tank.

2. Brief Description of the Prior Art

In a typical water treatment facility, raw sewage is received from the sewerage system and passed through a coarse screen to remove large pieces of matter. The sewage is next directed to one or more primary sedimentation tanks or clarifiers. The sewage remains in primary sedimentation for a period of time sufficient to allow the majority of the heavy matter to settle to the bottom of the tank, forming sludge. The sludge is removed for digestion by microorganisms and can be dried for use as compost or fertilizer. The remaining liquid is treated in a second biological system to remove ammonia. The liquid from this treatment is then aerated and passed into final sedimentation water treatment tanks to remove any remaining solid material.

Water treatment tank configurations vary with each treatment facility application. However, most final sedimentation water treatment tanks are round to eliminate inaccessible corners and provide uniform surfaces which simplifies automatic skimming, churning and/or bottom scraping operations.

In most sedimentation water treatment tanks, sediment containing water enters the center of the tank and the lighter clean water is continuously decanted from the heavier sediment containing water. Usually, the clean water is displaced from the tank by the constant flow of sediment containing water into the tank. The displaced clean water is forced to flow under a circular baffle plate which collects floating scum and then over a circular weir supported atop a circular spillway radially spaced a distance from the baffle plate, and ultimately enters a circular clean water flow channel which is radially spaced a distance from the spillway. Many weirs have a V-notched upper portion. The clean water flow channel directs the water to the next treatment stage where it further made safe to be discharged into a river or stream. An elongate skimmer arm having a depending skimmer blade revolves around the tank to provide churning and prevent sludge buildup to a limited extent.

The exposure of water treatment tanks to direct sunlight promotes the growth of algae. Algae growth is most prevalent on the baffle, weir, spillway, and clean water channel members, and inhibits the flow of clean water from the tank. Further, the algae can be carried in thick masses and high concentrations in the clean water being discharged from the final treatment tank. Thus, the algae removing process must be done frequently, adding to the cost of operation of the facility.

Commonly, cleaning of the treatment tank is accomplished by scrubbing the baffle, weir spillway, and clean water flow channel by hand with brushes to remove the algae. This method is tedious, labor intensive, and costly.

There are several patents which disclose various algae removal and cleaning apparatus for use in sewage treatment tanks. However, most of these are relatively complex mechanisms having a system of brushes and supporting arms which are designed to simultaneously clean the inside and outside surfaces of the baffle, the inside surface of the weir, and the opposed side surfaces of the clean water flow channel.

Because most treatment tanks are quite large, usually 60 feet in diameter or more, the baffle plate, weir, spillway, and clean water flow channel are not perfectly circular. Thus, in a single tank, there are wide variations in the radial distance from the center of the tank to the surface to be cleaned, and variations in the radial distance between the baffle plate, weir, and clean water flow channel relative to one another.

Tank cleaning devices which are connected at the outer end of the rotating skimmer arm and have a system of brushes supported on arms for simultaneously cleaning opposing surfaces of the radially spaced baffle, weir, and clean water flow channel, are difficult to adjust to maintain in constant engagement with the surfaces due to the variations in radial distance and relative spacing of these members. In some cases, a brush may not even be in contact with the surface along portions of its circumference, and along other portions, it may engage too tightly and cause binding.

Another disadvantage of these types of devices is that they only clean one side of the weir, not both sides, and thus, do not effectively remove algae from both sides, nor effectively prevent buildup of algae and foreign matter in the notches of weirs having notches.

Riddle, U.S. Pat. No. 4,876,010 discloses an apparatus which is connected to a revolving arm for cleaning a sewage treatment tank. The apparatus has a series of nozzles, a skimmer blade, a first brush supported on a first arm for cleaning the exterior surface of a circular barrier and a pair of articulated arms which are positioned on each side of a hexagonal effluent channel which is U-shaped in cross section with the upstanding portions defining an inner and outer weir. A brush is connected to each articulated arm for cleaning only the exterior surface of the inner weir and only the exterior surface of the outer weir, respectively.

Hall, U.S. Pat. No. 4,830,748 discloses an apparatus which is connected to a revolving skimmer blade for cleaning algae and other debris from a round water treatment tank. The apparatus has a first set of three cleaning brushes which clean the inside and outside surfaces of the baffle and the inside surface of the weir. The brush for cleaning the inside surface of the baffle is mounted on its own support arm. A coil spring is provided between the support arm and main frame member to urge the cleaning brush into positive engagement with the inside surface of the baffle wall. The brushes for cleaning the outside surface of the baffle and the inside surface of the weir are mounted on a second support arm and face outwardly in opposite directions. These brushes are pivotally mounted on the base of the second support arm and are urged by a spring into substantially vertical alignment when placed in the operative cleaning position.

Hall, U.S. Pat. No. 4,978,447 discloses a self-propelled motorized carriage apparatus for cleaning algae and other debris from a round water treatment tank. The carriage apparatus has four wheels, two of which ride on the spillway, and the other two are supported in a C-shaped guide track channel installed on the inner wall of the clean water flow channel. Alternatively, the guide track channel can be eliminated by providing carriage apparatus with two wheels which ride on the spillway, and two wheels which are supported on the top surface of the spillway, and pinch rollers which are engaged on both sides of the weir and/or baffle. The apparatus has a first set of three cleaning brushes which clean the inside and outside surfaces of the baffle and the inside surface of the weir, a second set of brushes for cleaning the spillway, and a third set of brushes for cleaning the bottom and opposed side surfaces of the clean water flow channel.

The present invention is distinguished over the prior art in general, and these patents in particular by an apparatus for cleaning algae and debris from the inner and outer surfaces of a generally circular weir supported on a spillway and the top surface and outer side wall of the spillway in a water treatment tank. A main frame is mounted on the revolving skimmer arm of the tank. A pair of brushes are pivotally mounted to a lower end of a support arm with their bristles facing in opposed relation to engage each side of the weir for cleaning the inner and outer surfaces of the weir. The support arm is connected to the main frame by a universal joint to pivot in a vertical plane and move in an inward and outward direction relative to the center of rotation to compensate for out-of-round circular weir surfaces. The pair of brushes are biased downwardly in a vertical position by a compression spring and pivotally mounted to the lower end of the first support arm to allow pivotal movement when their lower ends engage a bracket or obstruction so that they will pass thereover and return to the vertical position. A third brush connected with the pair of brushes engages and cleans the upper surface of the spillway adjacent the outer surface of the weir. A fourth brush is pivotally mounted in a vertical position to the lower end of a second support arm to engage and clean the outer surface of the spillway and churn the water between the spillway and a peripheral clean water flow channel. A tension spring connected between the main frame and second support arm allows the support arm and fourth brush to move in an inward and outward direction relative to the center of rotation to compensate for out-of-round outer surfaces of the spillway.

SUMMARY OF THE INVENTION

It is therefore an object of the present invention to provide an apparatus and method for effectively cleaning algae and other debris from the weir of a water treatment tank.

It is another object of this invention to provide a weir cleaning apparatus which is quickly and easily installed on the existing revolving arm of a water treatment tank which carries the skimmer blade.

Another object of this invention is to provide a weir cleaning apparatus which will effectively clean both the inner and outer surfaces of the weir of a water treatment tank, including weirs which may not be perfectly circular.

Another object of this invention is to provide a weir cleaning apparatus which will significantly reduce algae and foreign matter from building up in the notches of the weir of a water treatment tank.

Another object of this invention is to provide a weir cleaning apparatus which will conform to imperfect circular weirs, surface irregularities, and support brackets as it revolves around a generally circular water treatment tank.

A further object of this invention is to provide a weir cleaning apparatus which is fully adjustable to compensate for a large range distances between the weir and irregular circular surfaces of various water treatment tanks.

A still further object of this invention is to provide a weir cleaning apparatus which is simple in construction, economical to manufacture, and reliable in operation.

Other objects of the invention will become apparent from time to time throughout the specification and claims as hereinafter related.

The above noted objects and other objects of the invention are accomplished by an apparatus for cleaning algae and debris from the inner and outer surfaces of a generally circular weir supported on a spillway and the top surface and outer side wall of the spillway in a water treatment tank. A main frame is mounted on the revolving skimmer arm of the tank. A pair of brushes are pivotally mounted to a lower end of a support arm with their bristles facing in opposed relation to engage each side of the weir for cleaning the inner and outer surfaces of the weir. The support arm is connected to the main frame by a universal joint to pivot in a vertical plane and move in an inward and outward direction relative to the center of rotation to compensate for out-of-round circular weir surfaces. The pair of brushes are biased downwardly in a vertical position by a compression spring and pivotally mounted to the lower end of the first support arm to allow pivotal movement when their lower ends engage a bracket or obstruction so that they will pass thereover and return to the vertical position. A third brush connected with the pair of brushes engages and cleans the upper surface of the spillway adjacent the outer surface of the weir. A fourth brush is pivotally mounted in a vertical position to the lower end of a second support arm to engage and clean the outer surface of the spillway and churn the water between the spillway and a peripheral clean water flow channel. A tension spring connected between the main frame and second support arm allows the support arm and fourth brush to move in an inward and outward direction relative to the center of rotation to compensate for out-of-round outer surfaces of the spillway.

BRIEF DESCRIPTION OF THE DRAWINGS

FIG. 1 is a perspective view of the weir cleaning apparatus in accordance with the present invention.

FIG. 5 is a perspective view of a brush attachment having a lower portion formed of elongate strips of flexible material.

DESCRIPTION OF THE PREFERRED EMBODIMENT

Figure 2:
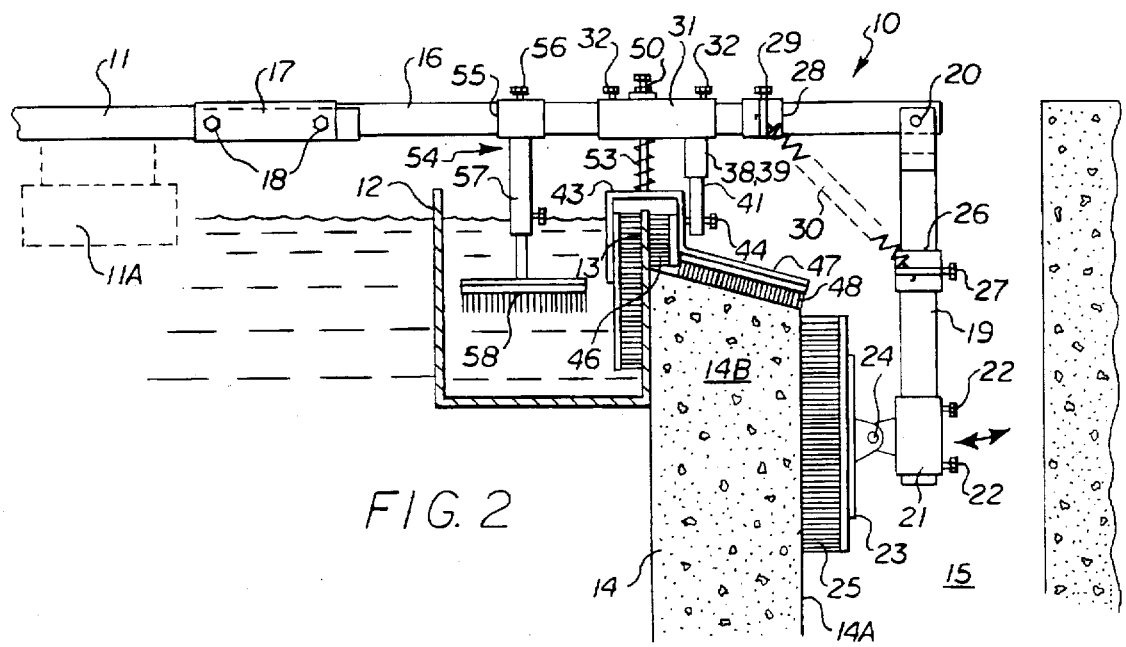
FIG. 2 is an elevational view of the cleaning apparatus of the present invention shown installed on the skimmer arm of a water treatment tank with the brushes engaged on the weir and the upper surface and outer wall of the spillway of the tank.

Referring to the drawings by numerals of reference, there is shown in FIGS. 1 and 2, a preferred weir cleaning apparatus 10 which is adapted to be installed on the skimmer arm of a sedimentation water treatment tank. FIG. 2 shows the apparatus 10 installed on the existing skimmer arm 11 of a conventional water treatment tank.

In most installations, clean water is displaced from the tank by the constant flow of heavier sediment containing water into the tank. The displaced clean water flows under a circular baffle plate 12 which collects floating scum and then over a circular weir 13 supported atop a circular spillway 14 radially spaced a distance from the baffle plate, and enters a circular clean water flow channel 15 which is radially spaced a distance from the spillway. The illustrated weir 13 is the type having a V-notched upper portion. The elongate skimmer arm 11 has a depending skimmer blade 11A and revolves around the circular tank to provide churning and direct floating debris to a drain.

The weir cleaning apparatus 10 has a tubular main frame 16 which is installed on the outer end of the existing skimmer arm 11 that carries the skimmer blade 11A and the apparatus 10 is driven around the tank by the skimmer arm. A mounting bracket 17 at the inner end of the main frame 16 is received on the outer end of the skimmer arm 11 and is secured thereon by set bolts 18. The mounting bracket 17 allows quick and easy installation and adjustable positioning of the main frame 16 along the longitudinal axis of the skimmer arm 11. The outer end of the main frame 16 extends outwardly over the baffle plate 12 and the weir 13 to a position above the outer surface of the spillway 14.

A vertical side wall brush support arm 19 is pivotally mounted at its upper end at the outer end of the main frame 16 by a pivot pin connection 20. A brush mounting collar 21 is slidably received on the lower end of the support arm 19 and is secured thereon by set bolts 22. The set bolts 22 allow the collar 21 to be adjustably positioned along the longitudinal axis of the support arm 19. A brush bracket 23 is pivotally connected to the collar 21 by a pivot pin connection 24 and a brush 25 is secured to the bracket. The connection 24 allows the brush to pivot 25 about the pivot connection at an angle relative to a vertical plane.

A first spring mounting collar 26 is slidably received on the support arm 19 intermediate the upper pivotal connection 20 and the brush mounting collar 21 and is secured thereon by a set bolt 27. The set bolt 27 allows the collar 26 to be adjustably positioned along the longitudinal axis of the support arm 19. A second spring mounting collar 28 is slidably received on the main frame 16 inwardly of the outer pivotal connection 21 and is secured thereon by a set bolt 29. The set bolt 19 allows the collar 28 to be adjustably positioned along the longitudinal axis of the main frame 16. A tension spring 30 has one end secured to the first and second spring mounting collars 26 and 28, respectively, and extends generally diagonally therebetween.

The spring 30 applies a tension force between the main frame 16 and the support arm 19 to spring bias the brush 25 into firm engagement with the outer surface 14A of the spillway 14 and allows it to travel in and out relative to the center of rotation of the skimmer arm 11. The pivotal connection 24 of the brush 25 allows it accommodate surface irregularities. The adjustable first and second spring mounting collars 26 and 28 allow the amount of brush engagement force to be varied and allows the spring 30 to be positioned to clear any obstructions. The brush 25 serves clean the exterior side wall 14A of the spillway 14 and also provides churning of the water in the clean water channel 15.

Figure 4:
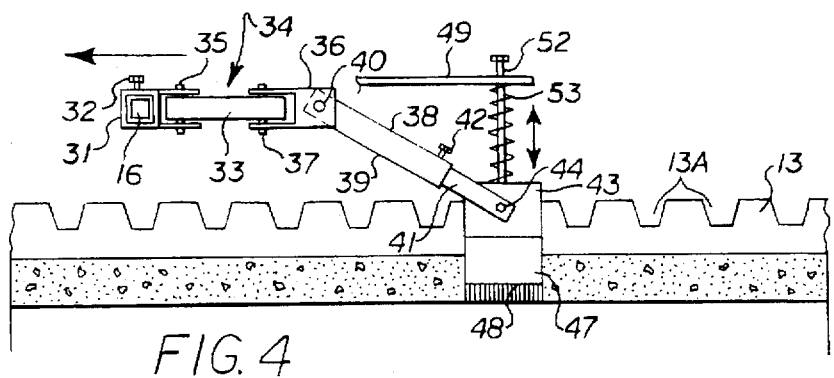
FIG. 4 is a side elevation of the inner surface of the weir and top portion of the spillway showing the weir brush assembly being pulled along the weir.
Figure 3:
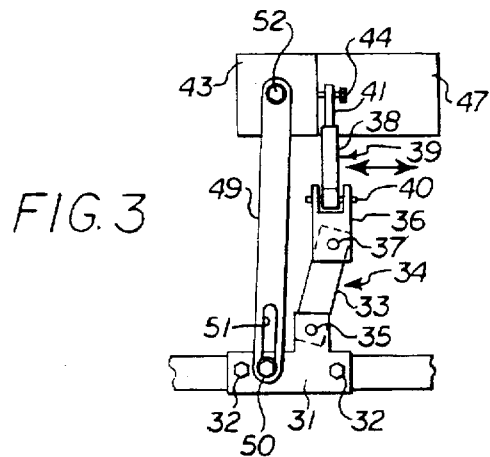
FIG. 3 is a top plan view of the universal joint connection of the weir cleaning support arm.

Referring additionally to FIGS. 3 and 4, a universal joint mounting collar 31 is slidably received on the main frame 16 inwardly of the second spring collar 28 and is secured thereon by set bolts 32. The set bolts 32 allow the collar 31 to be adjustably positioned along the longitudinal axis of the main frame 16 above the weir 13. A horizontal member 33 of a universal joint 34 is pivotally mounted at one end to the collar 31 by a vertical pivot pin connection 35 and has a bracket 36 pivotally connected at its opposite end by a second vertical pivot pin connection 37. The horizontal member 33 extends horizontally outward from the main frame 16 and pivots in a horizontal plane.

The upper member 38 of a telescoping weir brush support arm 39 is pivotally mounted at its upper end to the bracket 36 by a horizontal pivot pin connection 40 and pivots in a vertical plane. The upper portion of the lower member 41 of the weir brush support arm 39 is slidably received inside the upper member 38 and is secured therein by a set bolt 42. The set bolt 42 allows the longitudinal length of the weir brush support arm 39 to be adjusted.

An inverted, generally U-shaped weir brush bracket 43 is pivotally connected to the lower end of the lower member 41 of the weir brush support arm 39 by a horizontal pivot pin connection 44 or stove bolt. A pair of brushes 45 and 46 are mounted vertically on the inner sides of the bracket 43 with their bristles facing in laterally opposed relation to be received and engaged one on each side of the weir 13 for cleaning both surfaces of the weir. In other words, the brushes 45 and 46 straddle the weir 13 and clean the inner and outer surfaces simultaneously with substantially equal force on both surfaces. This arrangement also allows the brushes 45 and 46 to dislodge algae and foreign matter which may have been built up in the notches 13A of the weir 13. The horizontal pivot pin connection 44 allows the bracket 43 and brushes 45 and 46 to trail behind the main frame 16 in a generally vertical orientation.

The inverted U-shaped weir brush bracket 43 may also be provided with an extension 47 extending outwardly from the outer side of the bracket. A brush 48 is secured to the underside of the extension 47 with its bristles facing downwardly therefrom to engage the upper surface 14B of the spillway 14 adjacent the outer surface of the weir 13. The extension 47 may extend perpendicularly outwardly for cleaning horizontal wall surfaces or, as shown, may extend angularly downwardly to engage angular surfaces. It should also be understood, that the extension 47 may be connected to the inverted U-shaped weir brush bracket 43 by a hinge connection for cleaning either horizontal or angular surfaces, and may be biased into engagement by a spring extending between the weir brush bracket and extension (not shown).

One end of a horizontal support bar 49 is pivotally and slidably connected to the universal joint mounting collar 31 by a bolt 50 received vertically through a longitudinal slot 51 in the bar and the bar is pivotal and slidable in a horizontal plane relative to the main frame 16. An elongate headed vertical pin 52 extends slidably through a hole in the outer end of the bar 49 and its lower end is connected to the top of the inverted U-shaped weir brush bracket 43. A compression spring 53 is received on the pin 52 and has its top end engaged on the underside of the bar 49 and its bottom end engaged on the top of the weir brush support bracket 43. The compression spring 53 exerts a positive downward force between the support bar 49 and the weir brush bracket 43 to bias it normally downward to maintain engagement of the brushes 45 and 46 with the weir surfaces, but allows the bracket to ride a short distance vertically upwardly against the spring force if the weir brushes contact an obstruction along the lower portion of the weir.

It should be noted that the horizontal support bar 49 and the horizontal member 33 of the universal joint 34 allows the weir brush support arm 39 to move horizontally inward and outward in relation to the center of rotation of the skimmer arm to maintain both brushes 45 and 46 engaged on the inner and outer surfaces of the circular weir 13 as it revolves around the circular tank. Not all weirs are perfectly circular and, in a single tank, there may be wide variations in the radial distance from the center of the tank to the surface of the weir. This horizontally inward and outward movement of the weir support arm 39 in relation to the center of rotation of the skimmer arm compensates for "out-of-round" weirs and irregular movement of the skimmer arm and maintains the weir brushes in constant engagement with the weir as they are guided along the weir.

As shown in FIGS. 1 and 2, the weir cleaning apparatus 10 may also be provided with a churning attachment 54. The churning attachment 54 includes a collar 55 slidably received on the main frame 16 and secured thereon by a set bolt 56 inwardly from the universal joint mounting collar 31. A telescoping support arm 57 is rigidly secured to the collar 55 at its upper end and extends downwardly therefrom. The lower end of the support arm 57 is provided with an agitating member 58 which may be a brush or a rectangular plate configured to cause turbulence as it passes through the water. The set bolt 56 allows the collar 55 to be adjustably positioned along the longitudinal axis of the main frame 16 such that the agitating member 58 is disposed beneath the water surface between the baffle plate 12 and the weir 13. The agitating member 58 need not engage any surface structure, as its purpose is to agitate the water and break up floating algae and debris so it will pass through the V-notches 13A of the weir 13.

Many treatment tanks have a "double weir" wherein the weir has a second upstanding circular wall spaced between the baffle plate 12 and the outer wall of the weir 13 defining a U-shaped trough between the upstanding walls.

FIG. 5 shows another brush attachment 60 which may be installed on the main frame 16 and to clean the trough in a double weir installation. The brush 60 has a collar 61 slidably received on the main frame 16 and secured thereon by one or more set bolts 62. A brush member 63 secured to the bottom of the collar 61 extends downwardly therefrom. In a preferred embodiment, the brush member 63 is formed of a plurality of elongate strips 63A of flexible material such as a foam rubber, similar to the flexible brushes used in some car wash machines. The brush 60 may be positioned on the main frame inwardly from the universal joint mounting collar 31 and the elongate flexible strips 63A of the brush member 63 extend downwardly into the trough of the double weir and engage and clean the bottom surface of the trough, agitate the water and break up floating algae and debris. The elongate strips 63A are sufficiently flexible to ride over brackets and obstructions along the circular path. The brush 60 may be used in combination with the other brushes and agitating member described previously, or may replace the agitating member. The brush 60 may also be positioned in various other locations along the length of the main frame 16 to engage and clean other surfaces of the treatment tank or to agitate the water and break up floating algae and debris.

While this invention has been described fully and completely with special emphasis upon a preferred embodiment, it should be understood that within the scope of the appended claims the invention may be practiced otherwise than as specifically described herein.

I claim:

1. An apparatus for cleaning algae and other debris from the inner and outer surfaces of a generally circular weir supported on a spillway of a round water treatment tank including a central influent, a revolving skimmer arm, a generally circular baffle, and a peripheral clean water flow channel, comprising:

frame means mounted on said revolving skimmer arm and driven around the full circumference of said generally circular weir by said skimmer arm;

first cleaning means including a support arm pivotally connected at an upper end to said frame means to pivot in a vertical plane relative thereto and for movement in an inward and outward direction in relation to the center of rotation of said skimmer arm to compensate for out-of-round and imperfect circular weir surfaces, and a pair of brushes pivotally mounted at a lower end of said support arm with their bristles facing each other in laterally opposed relation to be received and engaged one on each side of said weir for cleaning said inner and outer surfaces of said weir.

2. The apparatus set forth in claim 1, wherein said first cleaning means includes a collar slidably received on said frame means and means for securing said collar at selective positions along the length thereof; and a universal joint member having one end connected to said collar and said support arm is pivotally connected at an upper end to another end of said universal joint.

3. The apparatus set forth in claim 1, wherein said pair of brushes are disposed in a generally vertical orientation and pivotally mounted to said lower end of said support arm to pivot in a generally vertical plane about a horizontal axis; and said first cleaning means further includes resilient means for biasing said pair of brushes into a substantially vertical orientation and to allow pivotal movement of said pair of brushes when a lower end of either one of said pair of brushes engage a bracket or obstruction so that said pair of brushes will pass over said bracket or obstruction and are then returned to the biased substantially vertical orientation.

4. The apparatus set forth in claim 3, wherein said first cleaning means further includes a third brush connected with said pair of brushes and positioned relative thereto for cleaning an upper surface of said spillway adjacent said outer surface of said weir.

5. The apparatus set forth in claim 4, wherein said third brush is connected with said pair of brushes and is positioned with its bristles engaged on said upper surface of said spillway and connected with said pair of brushes to move therewith.

6. The apparatus set forth in claim 1, further including second cleaning means for cleaning an outside surface of said spillway and churning the water between said spillway and said clean water flow channel.

7. The apparatus set forth in claim 6, wherein said second cleaning means includes a second support arm pivotally connected at an upper end with said frame means to pivot in a vertical plane relative thereto and for movement in a horizontal inward and outward direction in relation to the center of rotation of said skimmer arm to compensate for out-of-round and imperfect circular outside surfaces of said spillway.

8. The apparatus set forth in claim 7, wherein said second cleaning means further includes a brush pivotally mounted to a lower end of said second support arm with its bristles facing inwardly to be received and engaged on said outside surface of said spillway for cleaning said outside surface.

9. The apparatus set forth in claim 8, wherein said brush is disposed in a generally vertical orientation and pivotally mounted to said lower end of said second support arm to pivot in a generally vertical plane about a horizontal axis to compensate for irregularities in said outer surface; and said second cleaning means further includes resilient means for biasing said lower end of said support arm inwardly and said brush against said outside surface of said spillway in a substantially vertical orientation such that said brush is maintained in biased engagement with said outer surface but is allowed to move in a horizontal inward and outward direction in relation to the center of rotation of said skimmer arm to compensate for out-of-round and imperfect circular outside surfaces of said spillway.

10. The apparatus set forth in claim 1, further including churning means supported on said frame means and having an agitating member at a lower end to be received beneath the water surface between said generally circular baffle and said generally circular weir for churning the water and breaking up algae and debris.

11. The apparatus set forth in claim 10, wherein said churning means includes a support arm connected at an upper end on said frame means to extend in a vertical plane relative thereto and a generally rectangular agitating member secured at a lower end of said support arm configured to cause turbulence in the water as it passes therethrough.

12. An apparatus for churning the water and breaking up algae and debris in a round water treatment tank of the type having a revolving skimmer arm, a central influent, a generally circular baffle, a generally circular weir radially spaced from said baffle, and a peripheral clean water flow channel, comprising:

frame means mounted on said revolving skimmer arm and driven around the full circumference of said generally circular weir by said skimmer arm; and churning means supported on said frame means and having an agitating member at a lower end which is received beneath the water surface and configured to travel through the water in the space between said generally circular baffle and said generally circular weir without direct engagement with said baffle and said weir for churning the water and breaking up algae and debris floating in the water space to facilitate passage of algae and debris through said weir.

13. An apparatus for cleaning surfaces and churning the water in a round water treatment tank of the type having a revolving skimmer arm, a central influent, a generally circular baffle, a generally circular weir radially spaced from said baffle, a generally circular U-shaped trough adjacent said weir having a bottom surface, and a peripheral clean water flow channel, comprising:

frame means mounted on said revolving skimmer arm and driven around the full circumference of said generally circular weir by said skimmer arm; and cleaning and churning means supported at an upper end at selective positions along the length of said frame means and having a plurality of elongate strips of flexible material extending vertically downward therefrom of sufficient length to extend beneath the water surface in the water in said trough for engaging and wiping said trough bottom surface, churning the water, and breaking up algae and debris floating in said trough as it is pulled therethrough by said skimmer arm.

14. A method for cleaning algae and other debris from the inner and outer surfaces of a generally circular weir supported on a spillway of a round water treatment tank having a central influent, a revolving skimmer arm, a generally circular baffle, and a peripheral clean water flow channel, comprising the steps of:

mounting a frame on said revolving skimmer arm;

said frame having a support arm connected thereto to pivot in a vertical plane and move in a horizontal inward and outward direction in relation to the center of rotation of said skimmer arm and a pair of brushes mounted to a lower end of said support arm with their bristles facing in laterally opposed relation, said pair of brushes spring biased downwardly by a positive spring force;

placing said pair of brushes on said weir to straddle said weir with said pair of brushes engaged on the inner and outer surfaces, respectively; and driving said skimmer arm around the full circumference of said generally circular weir such that said brushes are pulled along said weir to clean said inner and outer surfaces of said weir; and said support arm moves in a hirizontal inward and outward direction in relation to the center of rotation of said skimmer arm compensating for out-of-round and imperfect circular weir surfaces to maintain engagement of said brushes on said weir.

15. The method according to claim 14 including the steps of:

connecting a second support arm at an outer end of said frame to pivot in a vertical plane and move in a horizontal inward and outward direction in relation to the center of rotation of said skimmer arm and spring biased inwardly toward the center of rotation;

said second support arm having a brush pivotally mounted at a lower end with its bristles facing the center of rotation; and placing said brush on an outer surface of said spillway with its bristles engaged on said outer surfaces; such that said brush is pulled along said spillway outer surface to clean said outer surface of said spillway as said skimmer arm is driven around the full circumference of said generally circular weir; and said second support arm moves in a horizontal inward and outward direction in relation to the center of rotation of said skimmer arm compensating for out-of-round and imperfect circular outer surfaces of said spillway to maintain engagement of said brush on said outer surface.

16. The method according to claim 14 including the steps of:

connecting a third support arm to said frame to extend vertically downward therefrom beneath the water surface between said generally circular baffle and said generally circular weir;

said third support arm having an agitating member at a lower end thereof; and said agitating member is pulled through the water between said generally circular baffle and said generally circular weir as said skimmer arm is driven around the full circumference of said generally circular weir to churn the water and break up floating algae and debris.

17. The method according to claim 14 including the steps of:

installing a third brush at the lower end of said support arm adjacent said pair of brushes to move therewith with its bristles engaged on a top surface of said spillway adjacent the outer surface of said weir; such that said third brush is pulled along said spillway top surface to clean said top surface of said spillway as said skimmer arm is driven around the full circumference of said generally circular weir.

18. A method for cleaning surfaces and churning the water in a round water treatment tank of the type having a revolving skimmer arm, a central influent, a generally circular baffle, a generally circular weir radially spaced from said baffle, a generally circular U-shaped trough adjacent said weir having a bottom surface, and a peripheral clean water flow channel, comprising the steps of:

mounting a frame on said revolving skimmer arm;

mounting an elongate flexible cleaning and churning member on said frame which has a lower portion extending vertically downward therefrom beneath the surface of the water in said trough to engage said trough bottom surface; and driving said skimmer arm around the full circumference of said water treatment tank such that said elongate flexible cleaning and churning member lower portion is pulled through the water in said trough as said skimmer arm is driven around the circumference of said water treatment tank to wipe said trough bottom surface, churn the water through which it travels, and break up floating algae and debris.

* * * * *